United States Patent [19]
Ueda

[11] Patent Number: 5,504,844
[45] Date of Patent: Apr. 2, 1996

[54] OUTPUTTING METHOD AND APPARATUS WITH CONTROLLABLE MEMORY ALLOCATION

[75] Inventor: Shigeru Ueda, Wako, Japan

[73] Assignee: Canon Kabushiki Kaisha, Tokyo, Japan

[21] Appl. No.: 475,834

[22] Filed: Jun. 7, 1995

Related U.S. Application Data

[60] Continuation of Ser. No. 217,962, Mar. 25, 1994, which is a division of Ser. No. 203,499, Feb. 28, 1994, which is a continuation of Ser. No. 84,331, Jun. 30, 1993, abandoned, which is a continuation of Ser. No. 700,467, May 15, 1991, abandoned.

[30] Foreign Application Priority Data

May 17, 1990 [JP] Japan ........................... 2-125470

[51] Int. Cl.⁶ ................................................ G06K 15/00
[52] U.S. Cl. ........................................ 395/115; 395/112
[58] Field of Search .................................. 395/101, 109, 395/112, 113, 115, 116; 358/404, 444, 296

[56] References Cited

U.S. PATENT DOCUMENTS

| | | | |
|---|---|---|---|
| 4,706,127 | 11/1987 | Nobuta | 358/296 |
| 5,084,831 | 1/1992 | Morikawa et al. | 395/116 |
| 5,125,072 | 6/1992 | Ng | 395/112 |
| 5,159,681 | 10/1992 | Beck et al. | 395/425 |

*Primary Examiner*—Arthur G. Evans
*Attorney, Agent, or Firm*—Fitzpatrick, Cella, Harper & Scinto

[57] ABSTRACT

An outputting apparatus for receiving print data constructed by binary data and/or multi-value data from an external apparatus and for printing comprises: a memory having a multi-value data area and a binary data area of limited memory capacity; a reducing circuit to reduce the capacity of the binary data area when the amount of multi-value data is equal to or larger than a predetermined amount; a printer for reading out the multi-value data and the binary data from the memory; and a controller for controlling data storage into the binary data area and reading of the binary data from the binary data area synchronously with the printing by the printer when the binary data area has been reduced by the reducing circuit. By virtue of the memory capacity of the binary data variable in accordance with the amount of multi-value data, the memory space can be efficiently used.

8 Claims, 7 Drawing Sheets

OUTPUTTING METHOD AND APPARATUS WITH CONTROLLABLE MEMORY ALLOCATION

This application is a continuation of application Ser. No. 08/217,962, filed Mar. 25, 1994, which is a division of application Ser. No. 08/203,499 filed Feb. 28, 1994, which is a continuation of application Ser. No. 08/084,331, filed Jun. 30, 1993, now abandoned, which is a continuation of application Ser. No. 07/700,467 filed May 15, 1991, now abandoned.

BACKGROUND OF THE INVENTION

1. Field of the Invention

The present invention relates to a printing apparatus for receiving document data in which binary data and multi-value data mixedly exist from an external apparatus such as a host computer or the like and for printing.

2. Related Background Art

Hitherto, in document data in which characters and images mixedly exist, generally, the character data is constructed by binary data and the image data is constructed by multi-value data. In the case of printing such document data using a printer, multi-value data such as an image or the like is first converted into a binary pattern using a dither method or the like and is developed into a bit map memory. In the bit map memory, the binary pattern is synthesized with the binary data (characters or the like) and the resultant data is for printing.

However, in the case where multi-value data is converted into binary data, is developed into the binary bit map memory, and is then printed, so long as a process to convert it from multi-value data into binary data is executed by software, the burden on the CPU increases significantly, processing time increases, and throughput of the printer deteriorates. If hardware to convert from the multi-value data into the binary data is provided, circuit scale increases and the costs rise.

If data of the full size as much as up to one page is handled as multi-value data, a bit map memory to develop the multi-value data of one page as a binary pattern is needed. Assuming that a capacity of the bit map memory is set to, e.g., 150 d.p.i. and multi-value data of 64 gradations is substituted by the binary data By a density pattern method or the like, a printer which can print at a resolution of 1200 (=150×8) d.p.i. (namely, 64 gradations for 8×8 dots) is necessary. If image data for an area A4 size is stored at a resolution of 1200 d.p.i., a memory capacity of 16 Mbytes is needed, so that such a high resolution is unpractical in terms of cost.

On the other hand, if independent memories for the multi-value data and the binary data are used and the multi-value data has a resolution of 150 d.p.i. and 64 gradations (6 bits/pixel), a page memory to store the multi-value data of a capacity of about 1.6 Mbytes (≈256 kbytes× 6) corresponding to one page of A4 size is needed. As shown in FIG. 4, however, since the multi-value image data generally exists only in a part of a given page, in most cases, most of the areas in the page memory of 1.6 Mbytes are not used, and thus this approach is uneconomical.

SUMMARY OF THE INVENTION

The invention is made in consideration of the problems of the conventional methods mentioned above and it is an object of the invention to provide an outputting method and apparatus in which a memory for binary data and a memory for multi-value data are provided in a memory space and by making the memory capacity for the binary data variable in accordance with the amount of multi-value data, so that the memory space can be efficiently used.

To accomplish the above object, the method and apparatus of the invention comprises the following construction. That is, in a printing apparatus for receiving print data which is constructed by binary data and/or multi-value data from an external apparatus and for printing, the apparatus comprises: memory means having a multi-value data area and a binary data area in a limited memory capacity; reducing means for reducing the capacity of the binary data area when an amount of multi-value data is equal to or larger than a predetermined amount; printing means for simultaneously reading out the multi-value data and the binary data from the memory means and for printing; and control means for controlling the data storage into the binary data area and reading of the binary data from binary data area synchronously with printing by the printing means when the binary data area has been reduced by the reducing means.

In the above construction, the multi-value data area and the binary data area are provided in the limited memory capacity and when the amount of multi-value data is equal to or larger than the predetermined amount, the capacity of the binary data area is reduced. The multi-value data and the binary data are simultaneously read out of the memory means and are printed. When the binary data area is reduced by the reducing means, the data storage into the binary data area and reading operation of the binary data from the binary data area are controlled synchronously with the printing operation.

Thus, the printed binary data in the binary data area is replaced by the new binary data and the new binary data is sequentially read out and printed.

DETAILED DESCRIPTION OF THE PREFERRED EMBODIMENTS

The preferred embodiment of the invention will be described in detail hereinbelow with reference to the drawings. The invention can be applied to an apparatus or a system or can be also accomplished by supplying a program to an apparatus or a system.

Figure 1:
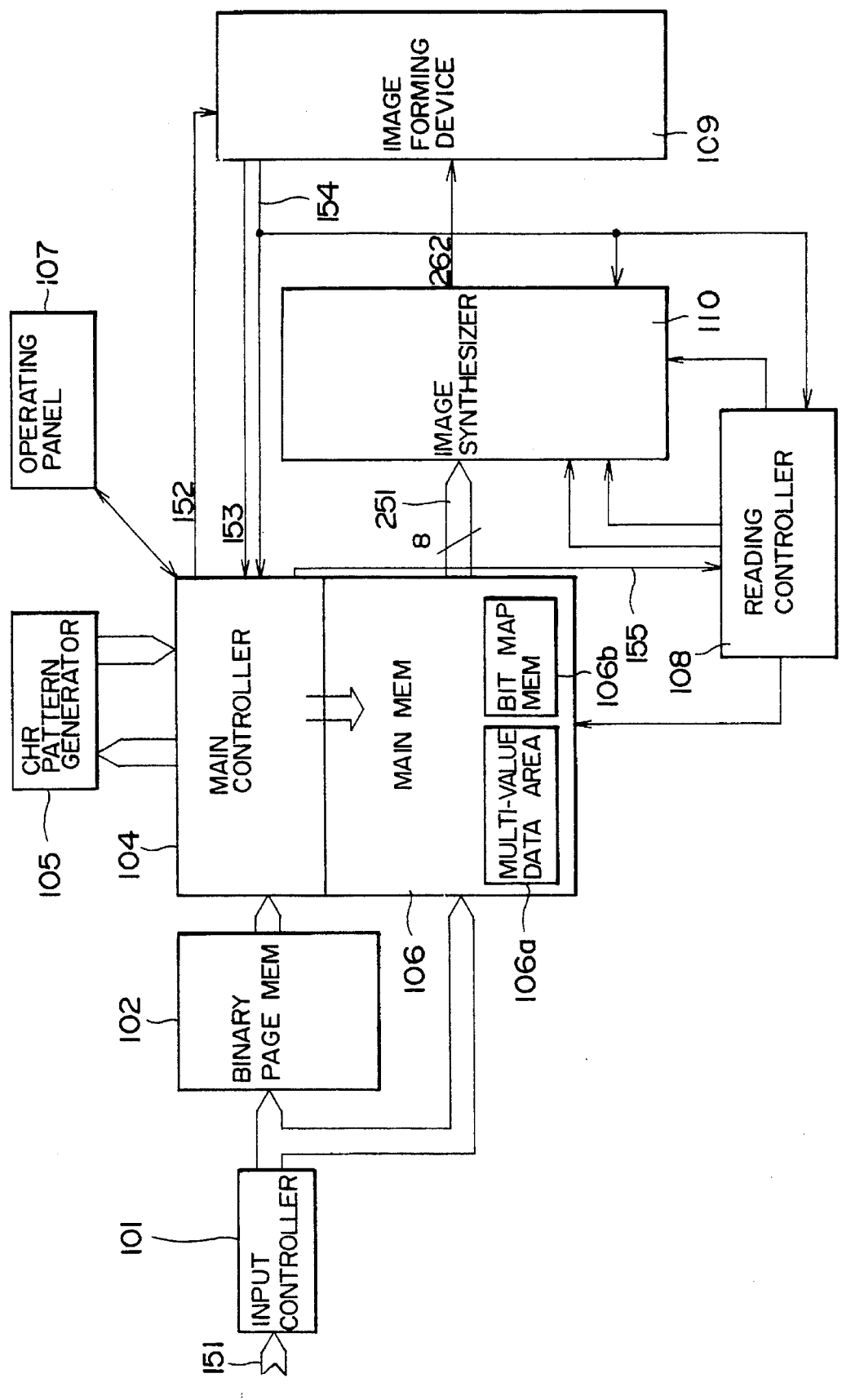
FIG. 1 is a block diagram showing a schematic construction of a printing apparatus of an embodiment of the present invention.

FIG. 1 is a block diagram showing a construction of a print data processor of a printing apparatus of the preferred embodiment.

In FIG. 1, reference numeral 101 denotes an input controller for receiving character codes or image data which is sent from a higher order apparatus such as a host computer or the like, for generating binary data such as character codes to a binary page memory 102, and for generating multi-value data such as image data to a main memory 106. Reference numeral 102 denotes the binary page memory in which the binary data constructed by character codes, control codes, or the like from the input controller 101 has been stored on a page unit basis; 104 a main controller to control the whole apparatus; 105 a character pattern generator in which pattern data has been stored in correspondence to the character codes and which receives the character codes supplied form the main controller 104 and can generate corresponding character patterns; and 106 the main memory including a multi-value data area 106a to store the multi-value data sent from the higher order apparatus and an area of a bit map memory 106b to develop the binary data such as character pattern or the like generated from the character pattern generator 105. A capacity of the bit map memory 106b is not set to a fixed value. For instance, such a capacity is decreased when a capacity of the multi-value data area 106a to store the multi-value data increases. Reference numeral 107 denotes an operation panel.

Reference numeral 110 denotes an image synthesizer shown in detail in FIG. 2, The image synthesizer 110 will be described in detail hereinbelow with reference to FIG. 2. Reference numeral 108 denotes a reading controller for receiving timing signals from the main controller 104 and an image forming device 109, for controlling a reading timing of the main memory 106 including the multi-value data area 106a and the bit map memory 106b, and for generating various timing signals to make the image synthesizer 110 operative, Reference numeral 109 denotes the-image forming device such as a laser beam printer or the like which receives dot data and prints on a recording paper or the like.

In the image forming device 109 in the embodiment, the binary data is printed at a resolution of 600 d.p.i. (dots per inch) and the multi-value data is printed at 150 d.p.i. and 64 gradations.

Figure 2:
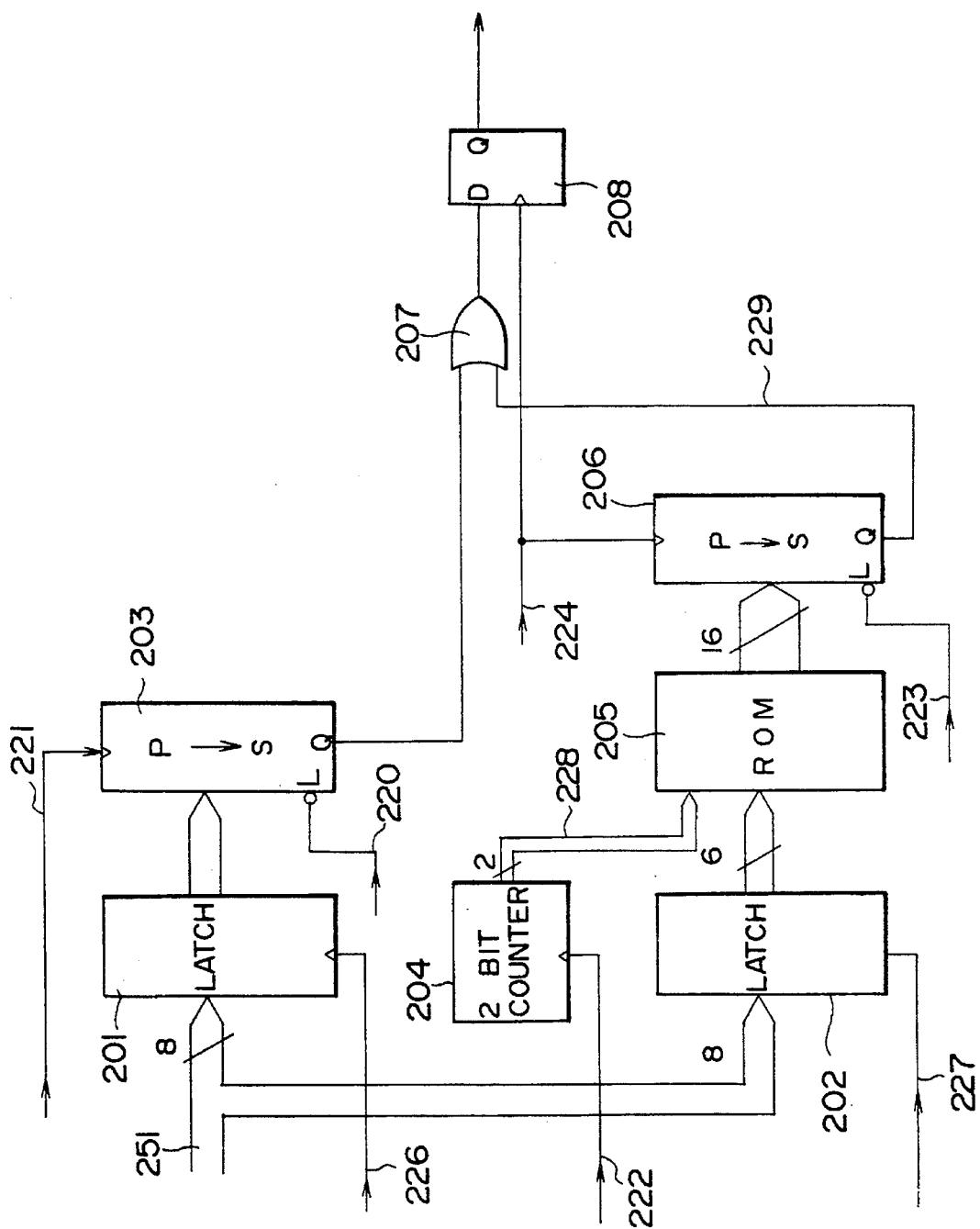
FIG. 2 is a block diagram showing in further detail age synthesizer from FIG. 1.

FIG. 2 is a block diagram showing an internal construction of the image synthesizer 110.

In FIG. 2, reference numeral 201 denotes a latch circuit to store binary dot data by a latch signal 226; 202 a latch circuit to store the multi-value data by a latch signal 227; and 203 and 206 parallel/serial (P/S) converters each for converting parallel signals into a serial signal. The P/S converter 203 loads 8-bit data from the latch circuit 201 by a load signal 220 and generates as a serial signal to an OR circuit 207 synchronously with a shift clock 221. Reference numeral 204 denotes a 2-bit counter for generating a signal indicative of a count value of count clocks 222 as a part of an address in a ROM 205.

Figure 6:
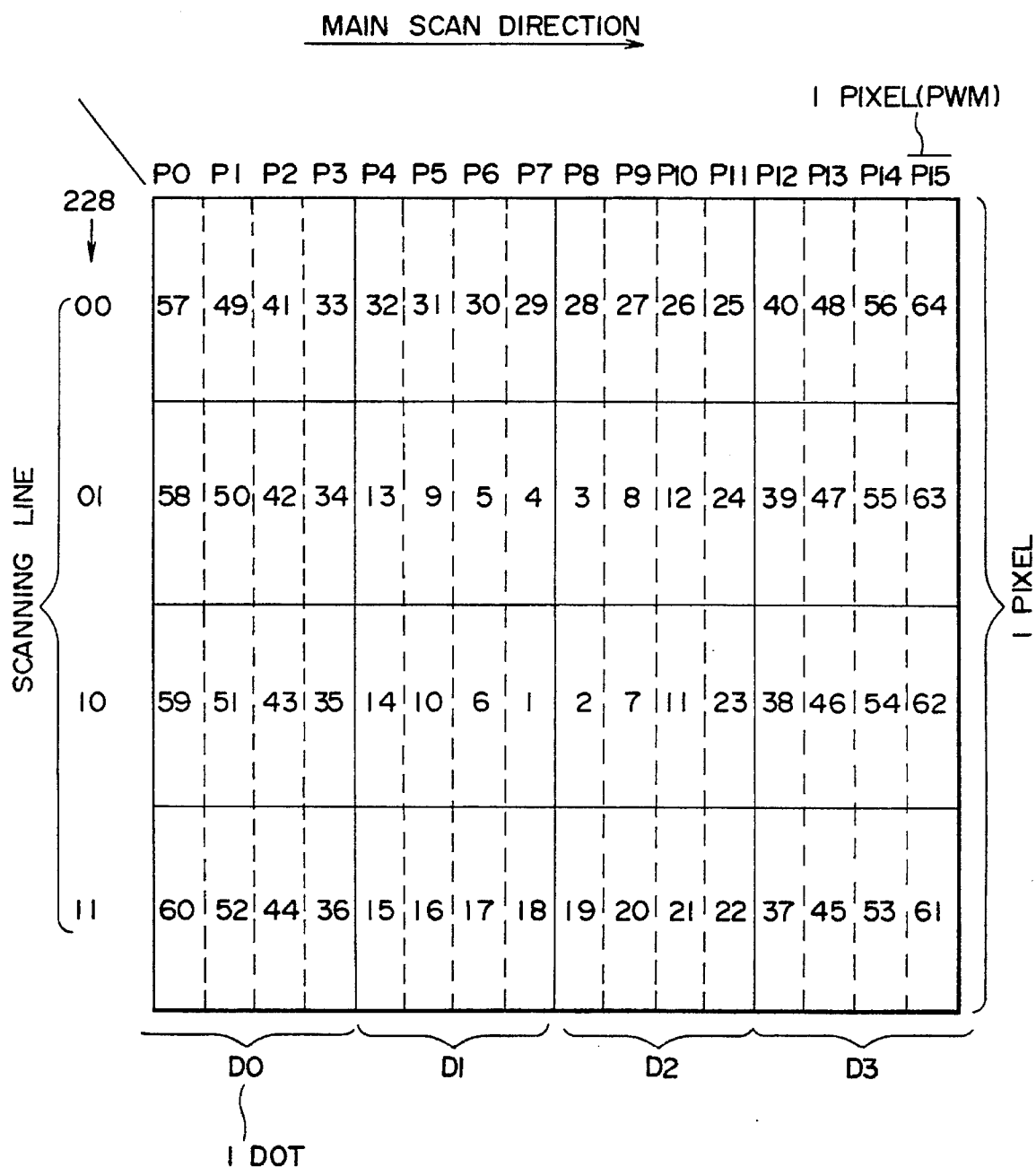
FIG. 6 is a diagram showing an example of data for PWM converting one pixel of multi-value data.

Reference numeral 205 denotes the ROM in which data shown in, for example, FIG. 6 has been stored. Reference numeral 206 denotes the P/S converter for loading 16-bit data supplied from the ROM 205 by a load signal 223, for converting into a serial signal by a shift clock 224, and for outputting. Reference numeral 208 denotes a D-type flip-flop (hereinafter, abbreviated to F/F) to latch an output of the OR circuit 207 synchronously with the shift clock 224.

Prior to describing the operation of the embodiment with reference to the block diagrams of FIGS. 1 and 2, a method of forming an image by a PWM method (pulse-width modulating method) used in the embodiment will be explained first.

According to the PWM method, in the case of outputting one dot expressed by binary data, a video signal width corresponding to the dot is dissolved (broken up) still more finely and the broken up pulse signal levels are changed, thereby changing the gradation of one dot and performing the gradation expression. Data such as image data which need gradations can be printed at a high quality.

FIG. 6 is a diagram showing a method which realizes the gradation printing by the PWM method.

In FIG. 6, a large square denotes one pixel. Since the multi-value data is printed at 150 d.p.i., The pixel size is equal to 1/150 inch. Each of (4×4) squares surrounded by solid lines which are obtained by dividing the large square indicates a size of one dot of the binary data, and in size is equal to 1/600 inch. Further, each of four rectangles separated by broken lines which are obtained by further dividing each of the small squares shows one pixel by the PWM method which is derived by dividing the pulse width into ¼ in the main scan direction of the raster scan.

As mentioned above, if the pixels (1 to 64) separated by the PWM method in the pixel of the size of 1/150 inch are sequentially painted in black, pixels having gradations of 64 levels are obtained.

Data shown in FIG. 6 is stored in the ROM 205 (FIG. 2) in the image synthesizer 110. The multi-value data indicative of the gradations of 64 levels from the latch circuit 202 and scanning line data 228 which is supplied from the 2-bit counter 204 and indicates which scanning line in FIG. 6 is being scanned are supplied to the ROM 205 as addresses. PWM data ($P_0$ to $P_{15}$) of 16 bits is generated from the ROM 205.

On the other hand, the reading controller 108 receives a reading start signal 155 from the main controller 104 and also receives a horizontal sync signal 154. After that, the controller 108 adjusts the timing so that a printing start position is set to the left edge of the recording paper and controls the image synthesizer 110.

When the binary data and the multi-value data are sent as data 151 from a higher order apparatus (not shown), the binary data is stored into the binary page memory 102 and the multi-value data is stored into the multi-value data area 106a in the main memory 106 under the control of the input controller 101. When the multi-value data is stored, data indicating to which portion of the recording paper the image data is printed is added and stored by the image forming device 109.

The main controller 104 checks a data capacity, other than that for the multi-value data stored in the main memory 106, and determines whether the printing is executed in a full bit mode or a partial window mode. The full bit mode is a mode in which an area in the bit map memory 106b to develop the binary data into a bit map is printed on one sheet of recording paper. Assuming that the image forming device 109 prints at 600 d.p.i., the capacity of the area of the memory 106b is equal to about 4 Mbytes in the case of the A4 size. It is a feature of the full bit mode that, differently from the partial window mode, which will be explained hereinlater, even very complicated data which needs a long analyzing time can be printed.

Differently from the full bit mode, in the partial window mode, the capacity of the bit map memory area 106b to develop the binary data to the bit map is set to a value corresponding to only a part of one page of the recording paper. Such a development area is called a window.

Figure 5:
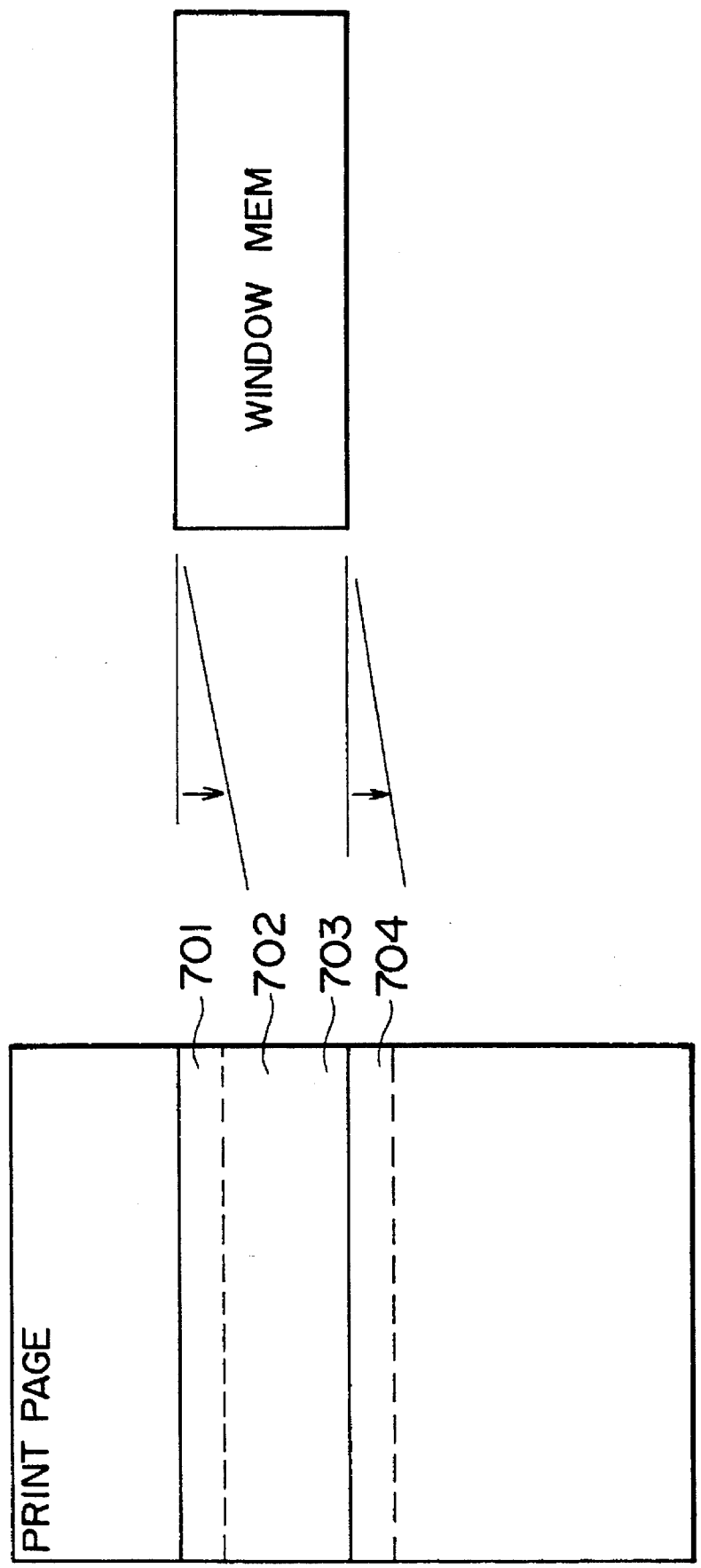
FIG. 5 is a diagram for explaining a partial window mode.

In the partial window mode, for instance, as shown in FIG. 5, the data corresponding to a window of the binary data in one page is developed into a pattern and sent to the image forming device 109. When the image forming device 109 is now printing a portion 701, a portion 703 is pattern developed into the bit map memory 106b. When the image forming device 109 is printing a portion 702, a portion 704 is pattern developed. In this manner, the binary data portion after the portion which is at present being printed is successively bit map developed and printed.

According to the above method, as capacity of the bit map memory 106b, it is sufficient to provide a capacity of a part of one page (e.g., 4 Mbytes), for instance, a capacity of 0.5 Mbytes, so that memory capacity can be saved. However, in the case where print data is complicated and a long time is required for pattern development, there is a drawback that it takes too late to prepare the whole pattern data to be sent to the image forming device 109 and the data cannot be printed.

Therefore, it will be obviously understood that the full bit map mode is better than the partial window mode if at least the memory capacity of one page can be reserved.

After all of the data to be printed has been prepared in the main memory 106, the main controller 104 sends a printing start signal 152 to the image forming device 109 and sends the first print data to the image synthesizer 110 and latches the print data into the latch 201 or 202. Since the data bus consists of eight bits, the binary data of eight dots of the first scanning line is sent to the image synthesizer 110. The multi-value data of the first scanning line of one pixel is supplied to the image synthesizer 110.

By receiving the printing start signal 152, the image forming device 109 generates a vertical sync signal 153 and the horizontal sync signal 154 to inform a printing position timing. The main controller 104 calculates the printing start timing by the signals 153 and 154. When the printing start position has come, the main controller 104 supplies the reading start signal 155 to the reading controller 108.

Figure 3:
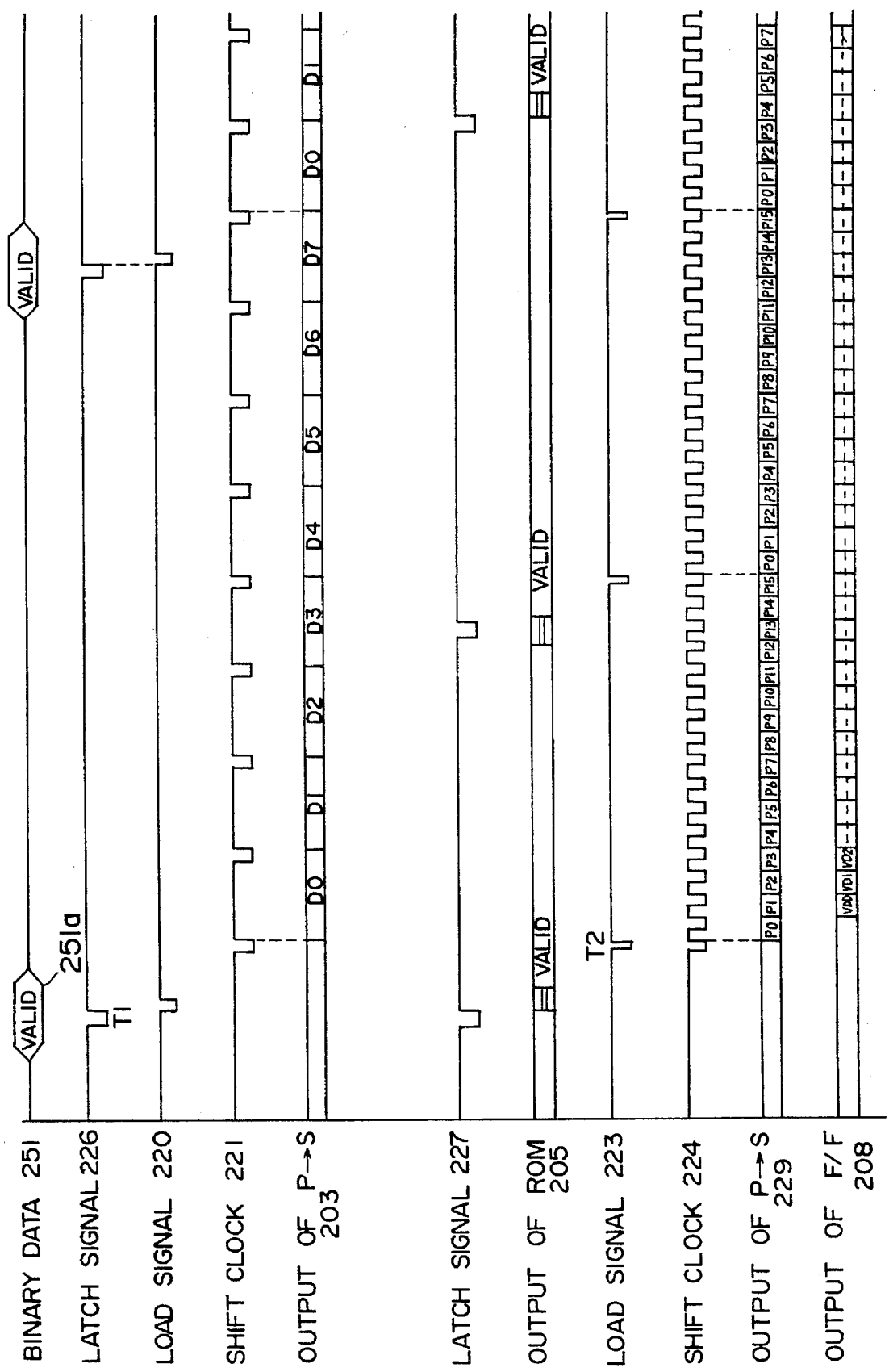
FIG. 3 is a timing chart for explaining the operation the embodiment of FIG.
Figure 4:
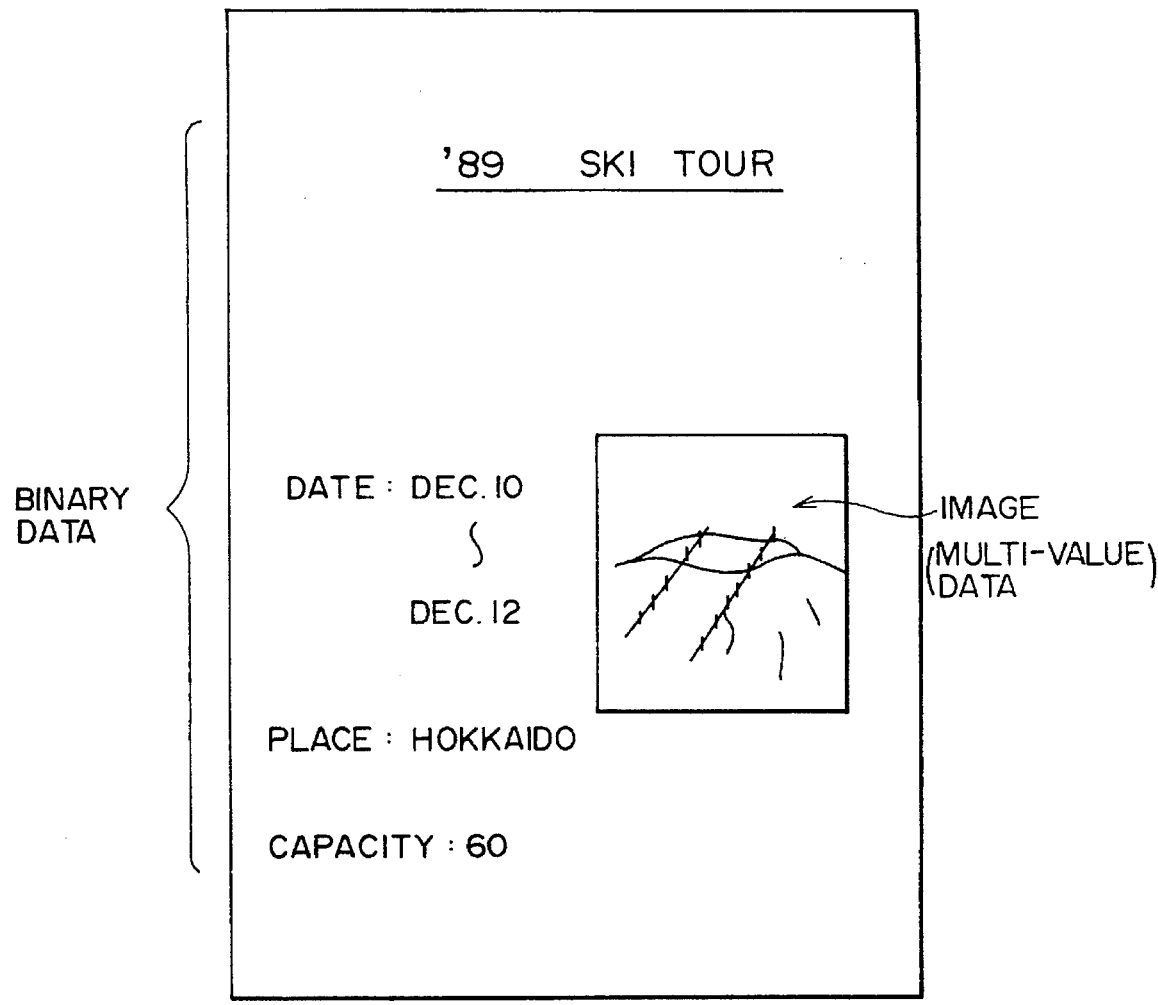
FIG. 4 is a diagram showing an example of a print of data in which binary data and multi-value data mixedly exist.

FIG. 3 is a timing chart showing a print data processing in the printing apparatus of the embodiment.

The reading controller 108 allows data 251a which has been latched into the latch circuit 201 by the latch signal 226 to be loaded into the P/S converter 203 at a timing $T_1$. On the other hand, the lower six bits of the data which has been latched into the latch circuit 202 by the latch signal 227 is supplied as gradation data to the address in the ROM 205 together with the horizontal line data 228. Due to this, the data based on the address is generated from the ROM 205 and is loaded into the P/S converter 206 by the load signal 223 at a timing $T_2$.

The operations of the P/S converters 203 and 206 will now be described. The data loaded in the P/S converters 203 and 206 is sequentially converted into the serial data by the shift clocks 221 and 224 and is generated. The binary data is converted into serial data $D_0$ to $D_7$ by the P/S converter 203. The multi-value data is converted into serial data ($P_0$ to $P_{15}$) 229 of 16 bits by the P/S converter 206. Those serial data are generated.

As will be understood from FIG. 3, since the multi-value PWM data 229 ($P_0$ to $P_{15}$) corresponds to four dots of the binary data, the serial data 229 is generated synchronously with the shift clock 224 of the frequency which is four times as high as the frequency of the shift clock 221 of the binary data ($D_0$ to $D_7$). As shown in the timing chart of FIG. 3, the transmission of the data ($P_0$ to $P_{15}$) of 16 bits from the ROM 205 is finished for a period of time when the serial binary data $D_0$ to $D_3$ is generated. Further, the next 16-bit datum ($P_0$ to $P_{15}$) from the ROM 205 is generated for a period of time when the serial binary data $D_4$ to $D_7$ is generated.

By repeating the above operations for all of the data of one page, data in which the binary data and the multi-value data mixedly exist in one page is printed.

In the partial window mode, the main controller 104 allows next pattern data to be developed into the bit map memory 106b from which the data has already been read out by the reading controller 108.

Figure 7:
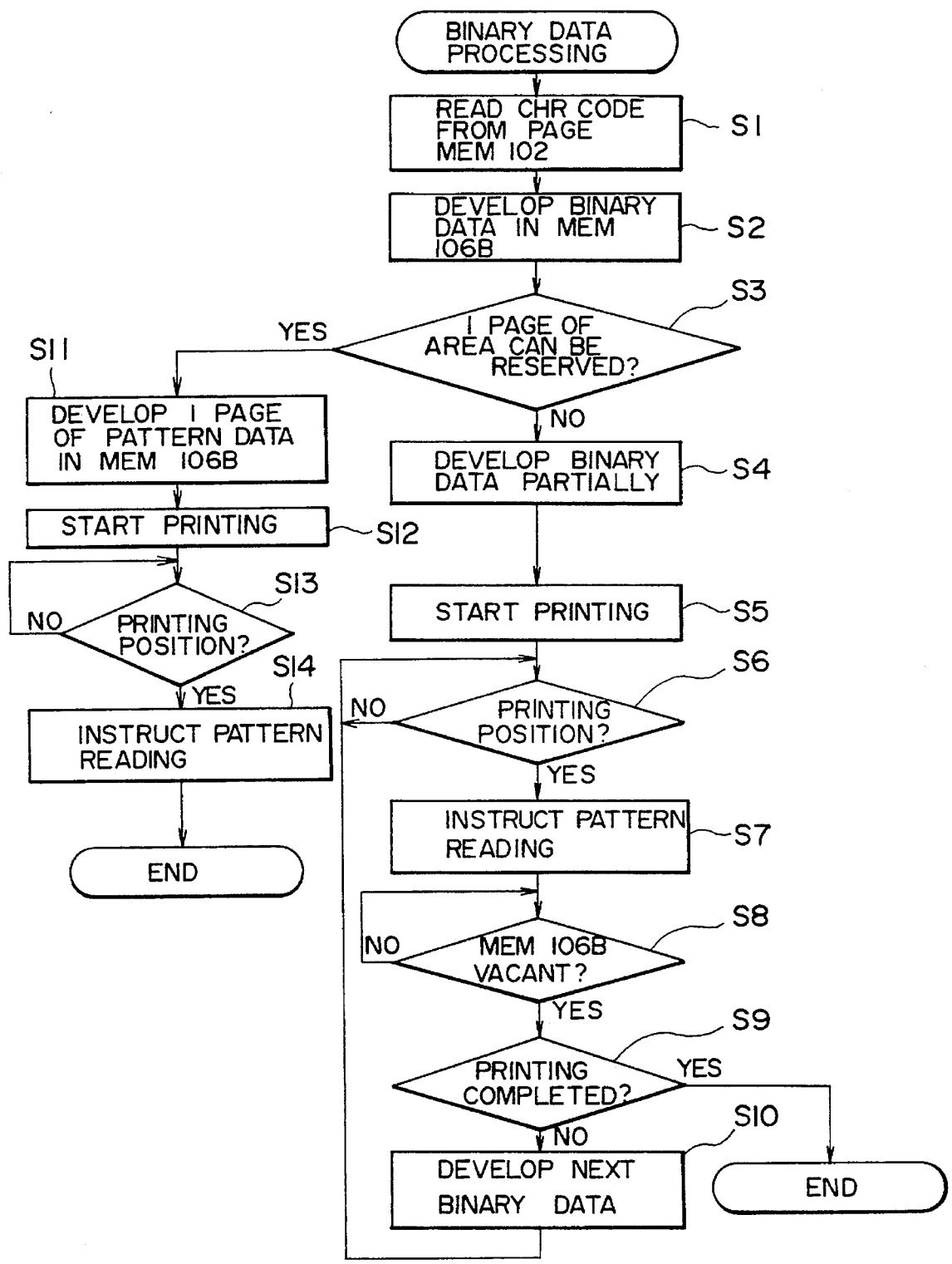
FIG. 7 is a flowchart showing a binary data process in the printing apparatus of the embodiment of FIG.

FIG. 7 is a flowchart showing the pattern development of the binary data and the printing process which are executed by the main controller 104 in the printing apparatus of the embodiment. The above processing routine is started after this binary data from the external apparatus has been transferred and stored into the binary page memory 102.

In the first step S1, a character code or the like is read out of the binary page memory 102. In step S2, the pattern developed binary data is pattern developed into the bit map memory 106b by using the character pattern generator 105. At this time, a check is made in step S3 to see if a capacity of one page of the A4 size (for instance, 4 MBytes) which is printed by the image forming device 109 can be reserved in the main memory 106 for the bit map memory 106b or not. If YES, step S11 follows. If NO, step S4 follows and a part of one page corresponding to the capacity which has been reserved as a bit map memory 106b is pattern developed into the bit map memory 106b.

In step S5, the printing start signal 152 is sent to the image forming device 109. In step S6, a check is made to see if the printing position has been reached or not by the horizontal and vertical sync signals. If YES, step S7 follows and the reading start signal is supplied to the reading controller 108, thereby instructing to read out the pattern data from the bit map memory 106b. In step S8, a check is made to see if there is a vacancy in the bit map memory 106b or not. If YES, step S9 follows and a check is made to see if the printing has been completed or not. If NO, step S10 follows and the next binary data is pattern developed and stored into the bit map memory 106b. Then, the processing routine is returned to step S6 and the above processes are again executed.

On the other hand, if the bit map memory 106b of the capacity of one page has been reserved in step S3, step S11 follows and the pattern data of one page is developed into the bit map memory 106b. In step S12, the start of the printing is instructed to the image forming device 109. In step S13, a check is made to see if the printing position has come or not in a manner similar to step S6. If the recording paper has reached the printing position to print the binary data, step S14 follows and the reading of the data from the bit map memory 106b is instructed to the reading controller 108.

Although not particularly described here, if multi-value data is included in the image data, the multi-value data portion is also simultaneously read out of the multi-value data area and is sequentially latched into the latch circuit 202 in the image synthesizer 110 and is pulse width modulated by the ROM 205 and is supplied to the image forming device 109.

Although the embodiment has been described with respect to the example in which the main memory 106 is constructed by the multi-value data area 106a and the bit map memory 106b to store the binary data, the invention is not limited to such a construction. For instance, the main memory 106 can be also used for, e.g., an auxiliary character pattern, a vector font, a font cache, etc., from the host computer.

As described above, according to this embodiment, there is the advantage that by increasing or decreasing the memory capacity of the binary data in accordance with the memory capacity and the multi-value data amount provided in the memory, the memory can be most effectively used and the data can be printed.

As described above, according to the invention, by providing the memory for the binary data and the memory for the multi-value data in the memory space and by making the memory capacity of the binary data variable in accordance with an amount of multi-value data, there is the advantage that the memory space can be efficiently used.

What is claimed is:

1. An output apparatus for receiving print data which comprises binary data and/or multi-value data from an external apparatus and for printing the received print data, said apparatus comprising:

memory means including a multi-value data area for storing multi-value data and a binary data area for storing binary data, the stored multi-value data and binary data having respective different resolutions;

control means for controlling a capacity of the binary data area in response to an amount of the multi-value data being equal to or larger than a predetermined amount;

discriminating means for discriminating whether a bit map memory area of one-page capacity can be reserved in said memory means; and output control means for outputting data comprising in mixture the binary data and the multi-value data stored in said memory means in a full bit mode or in a partial window mode according to a discrimination performed by said discriminating means.

2. A method of operating an output apparatus for receiving print data which comprises binary data and/or multi-value data from an external apparatus and for printing the received print data, said method comprising the steps of:

storing multi-value data and binary data in a multi-value area and a binary data area, respectively, of a memory, the stored multi-value data and binary data having respective different resolutions;

controlling a capacity of the binary data area in response to an amount of the multi-value data being equal to or larger than a predetermined amount;

discriminating whether a bit map memory area of one-page capacity can be reserved in the memory; and outputting data comprising in mixture the binary data and the multi-value data stored in the memory in a full bit mode or in a partial window mode according to a discrimination performed by said discriminating step.

3. An apparatus according to claim 1, wherein said monitor means checks the amount of stored data other than multi-value data.

4. An apparatus according to claim 1, wherein in the full bit mode, the stored data is printed using a bit map memory in which binary data is developed into bit map data, for a full page of a recording medium.

5. An apparatus according to claim 2, wherein in the partial window mode, the stored data is printed using a bit map memory in which binary data is developed into bit map data, for a portion of one page of a recording medium.

6. A method according to claim 2, wherein said monitoring step checks the amount of stored data other than multi-value data.

7. A method according to claim 2, wherein in the full bit mode, the stored data is printed using a bit map memory in which binary data is developed into bit map data, for a full page of a recording medium.

8. A method according to claim 2, wherein in the partial window mode, the stored data is printed using a bit map memory in which binary data is developed into bit map data, for a portion of one page of a recording medium.

* * * * *

UNITED STATES PATENT AND TRADEMARK OFFICE
CERTIFICATE OF CORRECTION

PATENT NO. : 5,504,844
DATED : April 2, 1996
INVENTOR(S) : Shigeru Ueda

It is certified that error appears in the above-indentified patent and that said Letters Patent is hereby corrected as shown below:

On title page, item [56]

REFERENCES CITED

After Line 4, insert

--OTHER PUBLICATIONS
1981 IEEE Workshop on Computer Architecture, Nov. 1981, Hot Springs, Virginia, USA, pp. 301-308, Goldwasser S.M., "A Generalized Segment Display Processor Architecture, page 302, left column, line 31 - right column, line 7, figures 1,3.

1982 IEEE
Conf. on Pattern Recognition and Image Processing, June 1982, Las Vegas, Nevada, USA, pp. 411-419, Goldwasser S.M. et al., "Page Composition on Continuous tone Imagery".--

ABSTRACT

Line 13, "virtue of" should read --virtue of making--.

UNITED STATES PATENT AND TRADEMARK OFFICE
CERTIFICATE OF CORRECTION

PATENT NO. : 5,504,844

DATED : April 2, 1996

INVENTOR(S) : Shigeru Ueda

It is certified that error appears in the above-identified patent and that said Letters Patent is hereby corrected as shown below:

COLUMN 1

```
Line 29, "is" should read --is generated--.
Line 35, "significantly" should read --significantly,--.
Line 45, "By" should read --by--.
Line 48, "area" should read --area of--.
```

COLUMN 2

```
Line 6,  "method" should read --outputting method--.
Line 30, "operation" should be deleted.
Line 43, "age" should read --an image--.
Line 45, "operation" should read --operation of--.
Line 46, "FIG.;" should read --FIGS. 1 and 2--.
Line 53, "FIG.;" should read --FIG.1--.
Line 57, "EMBODIMENTS" should read --EMBODIMENT--.
```

COLUMN 3

```
Line 9,  "page unit" should read --page-unit--.
Line 34, "operative," should read --operative.-- and
    "the-image" should read --the image--.
Line 66, "the" should read --this--.
```

COLUMN 4

```
Line 11, "The" should read --the--.
```

COLUMN 6

```
Line 10, "of the" should read --of this--.
```

UNITED STATES PATENT AND TRADEMARK OFFICE
CERTIFICATE OF CORRECTION

PATENT NO. : 5,504,844

DATED : April 2, 1996

INVENTOR(S) : Shigeru Ueda

It is certified that error appears in the above-identified patent and that said Letters Patent is hereby corrected as shown below:

<u>COLUMN 8</u>

Line 20, "claim 2," should read --claim 1,--.

Signed and Sealed this

Seventeenth Day of September, 1996

Attest:

BRUCE LEHMAN

Attesting Officer

Commissioner of Patents and Trademarks